United States Patent [19]

Borsuk et al.

[11] Patent Number: 4,666,238
[45] Date of Patent: May 19, 1987

[54] OPTICAL FIBER ALIGNMENT AND RETENTION DEVICE

[75] Inventors: Leslie M. Borsuk, Los Alamitos; Blake F. Woith, Irvine, both of Calif.

[73] Assignee: ITT Corporation, New York, N.Y.

[21] Appl. No.: 689,637

[22] Filed: Jan. 7, 1985

[51] Int. Cl.[4] ................................................ G02B 6/36
[52] U.S. Cl. .................................. 350/96.20; 350/96.18
[58] Field of Search ................ 350/96.18, 96.20, 96.21

[56] References Cited

U.S. PATENT DOCUMENTS

| 4,078,852 | 3/1978 | Lebduska | 350/96.18 |
|---|---|---|---|
| 4,129,932 | 12/1978 | Stancati | 350/96.21 X |
| 4,196,032 | 4/1980 | Eggleston | 350/96.2 X |
| 4,421,383 | 12/1983 | Carlsen | 350/96.18 X |
| 4,534,616 | 8/1985 | Bowen et al. | 350/96.20 |

FOREIGN PATENT DOCUMENTS 0139716  8/1982  Japan ................................ 350/96.2

OTHER PUBLICATIONS

L. A. Price, II and J. R. Statkevicus "Fiber-Optic Male Connector" IBM Technical Disclosure Bulletin, vol. 22, No. 10 (Mar. 1980) p. 4475.

Primary Examiner—John Lee
Attorney, Agent, or Firm—T. L. Peterson

[57] ABSTRACT

A fiber alignment and retention device having an optical lens with a forwardly directed curved surface molded to a rearward extension having a vee-shaped groove for supporting an optical fiber. An abutment means comprises a vertical stop for positioning the fiber at a focal point of the lens and also includes an abutment gap containing an index matching adhesive for reducing refraction and attenuation of a transmitted optical signal. A heat sensitive shrink sleeve secures the fiber within the vee-shaped groove such that a terminal end of the fiber is aligned with the focal point of the lens. A clamp or spring finger may replace the shrink sleeve, and a first alternative embodiment includes a holding means having a cylindrical shaped rearward extension with longitudinal cutaway sections providing a spring tension for securing the fiber. A second alternative embodiment includes a lens with a rearwardly directed radiused surface for guiding and retaining the fiber. A third alternative embodiment includes a modified abutment means for terminating the optical fiber.

6 Claims, 10 Drawing Figures

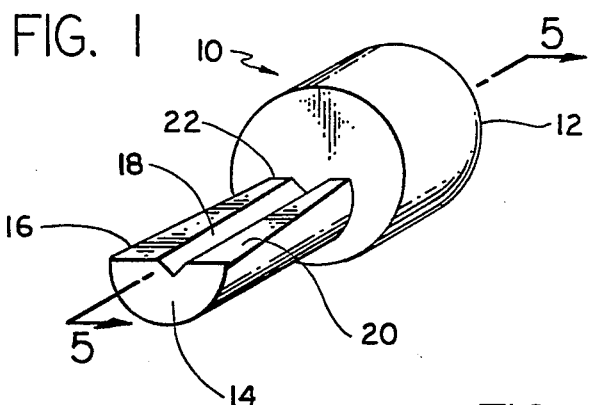
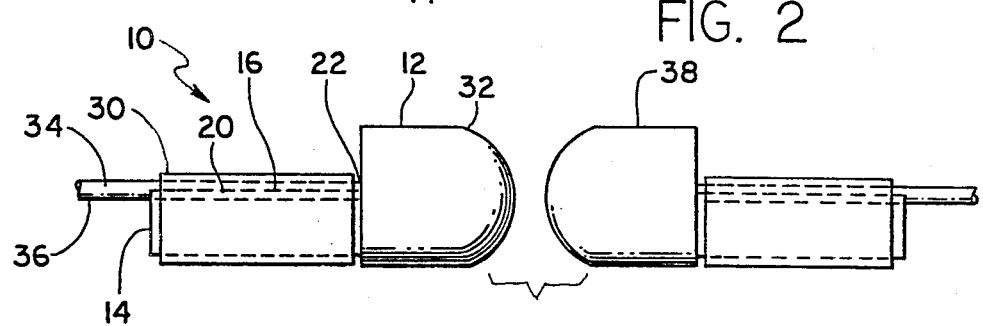
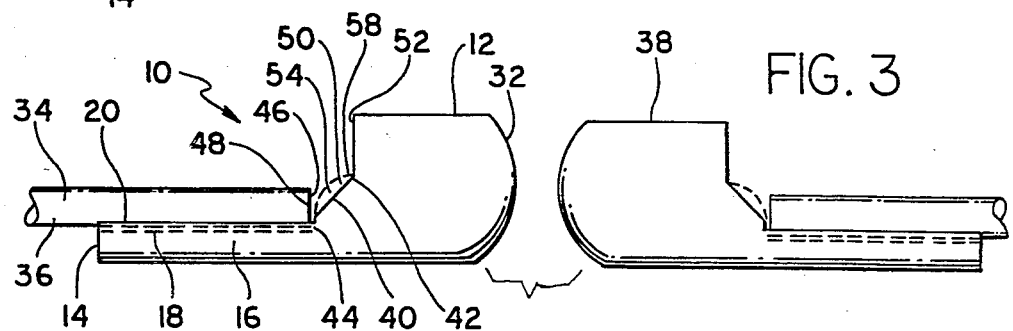
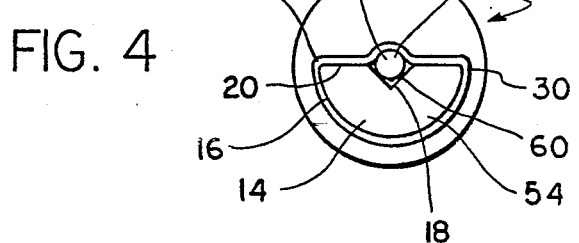

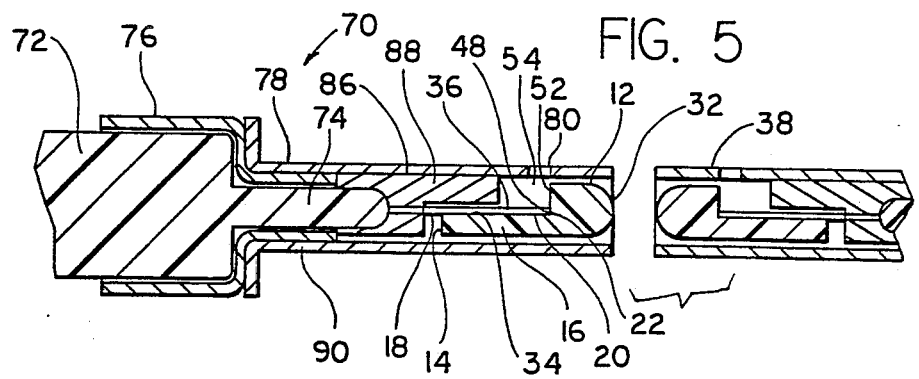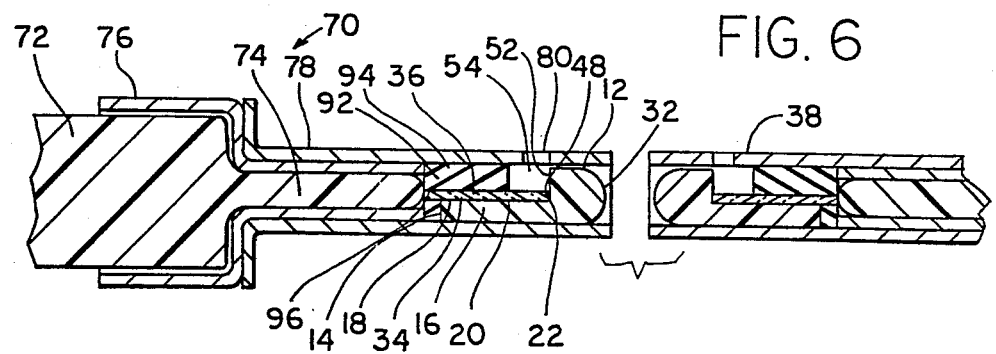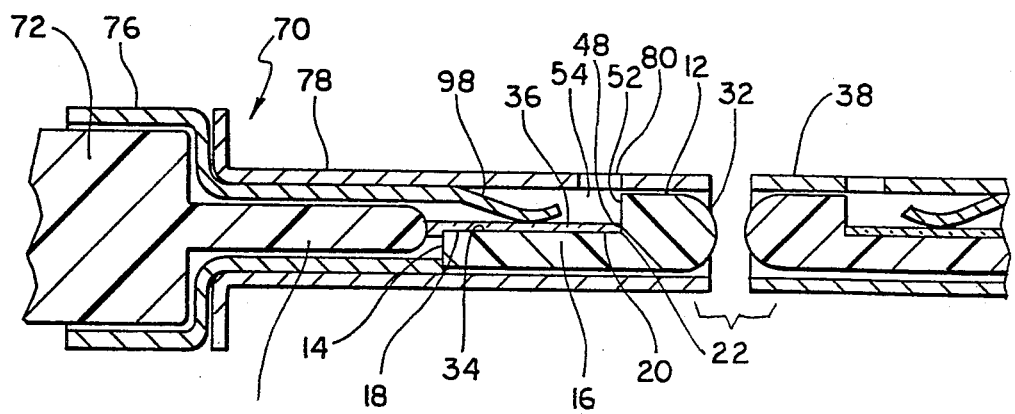

OPTICAL FIBER ALIGNMENT AND RETENTION DEVICE

BACKGROUND OF THE INVENTION

1. Field of the Invention

The invention relates generally to optical systems and more particularly to an optical contact for positioning and retaining an optical fiber with a lens.

2. Description of the Prior Art

In the field of optical communications, optical fibers are employed to carry data from a transmitting station to a receiving station. In order to transmit an optical signal from a light source via a first optical fiber to another optical conducting element, e.g., a second optical fiber, an optical lens is employed to redirect the light rays of the optical signal. Each optical fiber has an endface in which the optical signal must pass through. To prevent attenuation of the optical signal, the optical fiber endface must interface with the focal point along the optical axis of the lens.

In the past, several techniques were utilized to align the optical fiber to the lens. Each of the techniques employed one of a plurality of lens contacts for terminating the optical fiber. A first of these techniques teaches that the lens contact is terminated by micropositioning a "pigtailed" optical fiber, that is, the fiber is back illuminated and optimized in position. The optimized position of the fiber is accomplished by projecting the back illumination of the fiber through the lens to a target on a screen. When the back illumination through the lens strikes the target on the screen, the fiber is bonded securely and thus optimized in position with the fiber endface interfacing the focal point of the lens. A second of these alignment techniques involves providing a cylindrical hole behind the lens. The cylindrical hole is aligned along the optical axis of the lens and is blind ended at the focal point of the lens. Also, the cylindrical hole has a diameter that accommodates the optical fiber with a close fit and the optical fiber is bonded within the cylindrical hole with an index of refraction matched adhesive.

A problem associated with the first technique is the tedious requirement of adjusting the optical fiber to a stringent tolerance to permit the back illumination through the lens to strike the target. A second problem that exists in the second technique of alignment concerns a hydraulic effect that occurs when the fiber is inserted into the cylindrical hole. The index matched adhesive creates a hydraulic force that prevents the fiber endface from reaching the focal point of the lens, thus resulting in loss of light or attenuation of the optical signal.

Several prior art references which are relevant to the instant invention have been discovered and will be discussed briefly.

In Contina, British Pat. No. 1,017,354, there is disclosed a system in which light is transmitted from one element to another so that the difference in cross-sections between the elements can be effected within a very short distance without loss of intensity. An optical system comprised of two bundles of optical fibers is arranged with one end of a first bundle facing one end of a second bundle and spaced apart therefrom. The ends of the two bundles are of different areas and a transparent body optically couples the two ends together. The transparent body has a reflecting surface which is substantially ellipsoidal in shape and coaxial with the bundle ends. Light rays of the optical signal are reflected such that they pass through a focal point in an axial endface of the second bundle.

In Kahn, British Pat. No. 1,429,843, there is disclosed a coupling unit consisting of a first housing member and a second housing member each carrying an end region of one of two light guides. The first housing member has a first coupling formed to fit into a second coupling of the second housing member. The first light guide is held centrally in the first coupling by a first body and the second light guide is held centrally in the second coupling by a second body. During manufacture, the ends of the light guides may be polished with the faces of the first and second bodies. A lens is mounted between the ends of the two light guides. Accurate alignment between the lens and the light guides is required.

In Cook et at., U.S. Pat. No. 3,950,075, there is disclosed an optical communication system which includes a diode for emitting optical wave energy to be coupled to an optical waveguide bundle. A transparent spherical bead is axially aligned with the bundle and the center of the light emitting area of the diode. The bead is securely mounted in an aperture which extends through one end of an insert within a housing. Precise alignment of the center of the bead along the axis of the aperture results from a force fit. The diode is disposed in the housing for proper alignment of the light emitting area of the diode with the bead. The end of the bundle is disposed in a termination ferrule having an aperture, the bundle being potted in the ferrule by a bonding material. The ferrule maintains the fiber bundle in a substantially parallel alignment. A problem is the high tolerance alignment required between the diode, the bead and the bundle.

In Hunzinger, U.S. Pat. No. 4,102,559, there is disclosed an optical structure comprising two very thick plano-convex lenses with a common axis. The convex surfaces of the lenses face each other while a radiation source and an input face of a fiber are each disposed on one of the convex surfaces in the vicinity of the axis. The main feature of the device resides in the considerable thickness of the lenses relative to the radii of curvature of the dioptric faces. As a result, aberrations, in particular spherical aberrations, are reduced while the dimensions of the device are such as to enable easy construction and handling.

In Chown, U.S. Pat. No. 4,147,402, there is disclosed a process for manufacturing a lens termination for an optical fiber using laser machining to form a cavity which centers the fiber in the termination. A plastic preform is provided comprising a tube member with a coaxial bore having one end closed by a lens at least the rearward portion of which comprises a plastic material. The bore and lens are arranged such that the base of the bore lies in the focal plane of the lens. Light is directed from a laser through the lens so as to focus the light onto the base of the bore thus evaporating a portion of the plastic material to form a cavity which, when the termination is in use, receives the bared end of a coated optical fiber. An index matching adhesive is used to bond the fiber within the cavity which produces the previously described hydraulic force preventing the fiber endface from reaching the focal plane of the lens.

In Rush et al., U.S. Pat. No. 4,183,618, there is disclosed an optical waveguide including a connector having a longitudinal bore in which an end of an optical waveguide is to be anchored, lens means for transmitting light from one end of the waveguide and defining a recess including a focal point of the lens means, and a housing in which the connector and lens means are mounted. The terminal also includes an elongate optical member having first and second ends with respective end faces, the first end of the elongate optical member extending partially through the connector and being anchored therein, and the second end of the elongate optical member being mounted in the recess in the lens means with its end face disposed at the focal point of the lens means. The connector includes means for maintaining the first end of the optical member and an end of an optical waveguide in alignment with one another.

In Khoe et al., U.S. Pat. No. 4,327,963, there is disclosed a coupling element for an optical transmission system having a coupling element comprised of a convex lens with a refractive index. The refractive index is dependent on a radius "r" of a shell in the lens. The coupling element further includes a holder through which a capillary extends. The convex lens which is spherical is affixed to an end of an optical fiber with the lens-fiber interface being enclosed within the capillary. The capillary is preferably circular cylindrical in shape and may rest in a v-shaped groove of a holder. A transparent coupling medium may be disposed between the lens and the fiber for light refraction purposes.

Further, the prior art discloses a hermaphroditic rugged optical fiber connector which uses fibers terminated with miniature lenses and intended for use under adverse field conditions. A microlens is positioned on the end of each fiber to form an expanded beam termination which reduced the effect of dirt on the connector performance and provides easy cleaning. Two expanded beam terminations are housed in the rear insert, with a cable strength member clamp, which has a high tensile performance, and are located in a precision front insert in the connector body. A cable end and a plurality of fiber terminations are protected from the environment by being sealed in the connector body cavity. A replaceable protective window forms the cavity seal at the front of the connector while an O-ring in the endbell nut seals the cable entry.

After consideration of the known prior art relevant to the instant invention, the problems involving tedious alignment adjustments and the hydraulic effect resulting in optical signal attenuation still exist.

SUMMARY OF THE PRESENT INVENTION

It is therefore an object of the present invention to provide an improved fiber alignment and retention device capable of accurately aligning an optical fiber with lower tolerance measurements.

It is a further object to provide an improved fiber alignment and retention device capable of inexpensively retaining the aligned fiber position.

Briefly, a preferred embodiment of the present invention includes an optical lens having a forwardly directed curved lens surface and a holding means having a rearward extension with a longitudinally extending vee-shaped groove for supporting a first light transmitting optical fiber. The lens and rearward extension are fashioned from a single piece of plastic material with an abutment means comprised of a ramp section including a vertical stop at an interface therebetween. A focal point of the lens is located in the same vertical plane as the vertical stop and an abutment gap is formed between a rearward portion of the lens and the vertical stop. A heat sensitive shrink sleeve acts as a retention means for securing the optical fiber within the vee-shaped groove. The shrink sleeve includes an inner lining comprised of an index matching adhesive material.

The first light transmitting optical fiber is guided into the vee-shaped groove until a terminal end of the fiber abuts the fiber stop. The shrink sleeve is then placed about the rearward extension and heat shrunk to secure the fiber in the vee-shaped groove. The terminal end is located at the focal point of the lens which ensures the reduction of refraction and attenuation of an optical signal between the first light transmitting optical fiber and a second light transmitting optical fiber.

The preferred embodiment may also be practiced by eliminating the shrink sleeve and substituting therefor a metal mechanical clamp, an elastomeric clamp or a spring finger as the retention means.

A first alternative embodiment of the present invention includes an optical lens having a forwardly directed curved lens surface and a holding means molded to the lens including a cylindrical shaped rearward extension having a first half cylinder and a second half cylinder. A longitudinally extending vee-shaped groove is symmetrically located in a top surface of the first half cylinder between the first and second half cylinders. The second half cylinder includes a first and a second longitudinal cutaway section which provides a spring tension between the first and second half cylinders. An abutment means is provided at an interface between the first half cylinder and the lens for positioning a terminal end of a first light transmitting optical fiber at a focal point of the lens. The abutment means comprises a ramp section and a vertical stop which form an abutment gap which contains an index matching adhesive. A heat sensitive shrink sleeve is placed about the cylindrical shaped rearward extension for retaining the first optical fiber within the vee-shaped groove.

A second alternative embodiment of the present invention includes an optical lens having a forwardly directed curved lens surface and a rearwardly directed radiused surface. A holding means is connected to the lens and has a rearward extension with a longitudinally extending vee-shaped groove and a curved foot located at a rearward end of the rearward extension. An abutment means includes a vertical stop for positioning a terminal end of an optical fiber and an abutment gap which contains an index matching adhesive. When the optical fiber is inserted into the vee-shaped groove, the curved foot guides the fiber while the rearwardly directed radiused surface guides and retains the fiber in position.

A third alternative embodiment of the present invention includes an optical lens having a forwardly directed curved lens surface and a holding means having a rearward extension with a longitudinally extending vee-shaped groove for supporting a first light transmitting optical fiber as in the preferred embodiment. The lens and rearward extension are fashioned from a single piece of plastic material. However, the abutment means includes only a vertical stop located at a rearward portion of the lens and the focal point is located behind the vertical stop. A heat sensitive shrink sleeve may be used for retaining the optical fiber within the vee-shaped groove.

An advantage of the fiber alignment and retention device of the present invention is that the optical fiber may be accurately aligned with lower tolerance measurements.

Another advantage is that the fiber alignment and retention device inexpensively retains the aligned fiber position.

These and other objects and advantages of the present invention will no doubt become obvious to those of ordinary skill in the art after having read the following detailed description of the preferred embodiment(s) which are illustrated in the various drawing figures.

IN THE DRAWING

FIG. 1 is a perspective view of a fiber alignment and retention device in accordance with the present invention;

FIG. 2 is a side elevational view of the fiber alignment and retention device of FIG. 1 illustrating a first retention means;

FIG. 3 is a side elevational view of the fiber alignment and retention device of FIG. 1 illustrating an abutment means;

FIG. 4 is an end view of the fiber alignment and retention device of FIG. 1 illustrating the first retention means;

FIG. 5 is a cross-sectional view of an optical contact illustrating a second retention means for the fiber alignment and retention device taken along the line 5—5 of FIG. 1;

FIG. 6 is a cross-sectional view of an optical contact illustrating a third retention means for the fiber alignment and retention device of FIG. 1;

FIG. 7 is a cross-sectional view of an optical contact illustrating a fourth retention means for the fiber alignment and retention device of FIG. 1;

DETAILED DESCRIPTION OF THE PREFERRED EMBODIMENT

Figure 8:
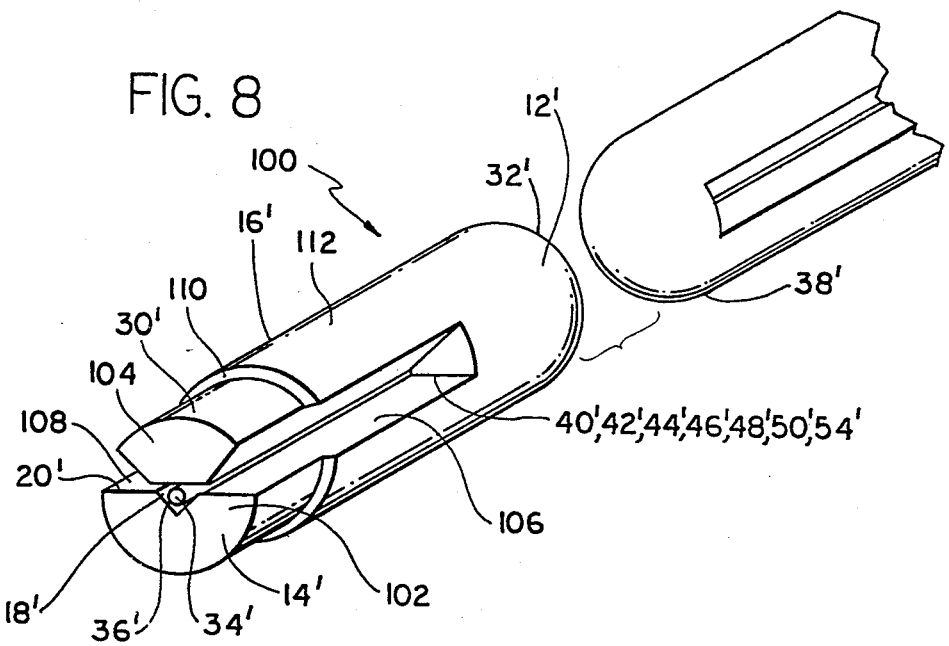
FIG. 8 is a perspective view of a first alternative embodiment of a fiber alignment and retention device of the present invention.

In FIG. 1, there is illustrated a fiber alignment and retention device referred to by the general reference character 10 and incorporating the present invention. The fiber alignment and retention device 10 includes an optical lens 12, a holding means 14, a rearward extension 16, a longitudinally extending vee-shaped groove 18 symmetrically located in a top surface 20 of the rearward extension 16 and an interface 22 located between the optical lens 12 and the rearward extension 16. A side elevation of the fiber alignment and retention device 10 shown in FIG. 2 includes a heat sensitive shrink sleeve 30, a forwardly directed curved lens surface 32, a first light transmitting optical fiber or source 34 for transmitting an optical signal 36 and a second optical conducting element 38 such as a receiving optical lens and a second light transmitting optical fiber for receiving the optical signal 36. Another side elevation of the fiber alignment and retention device 10 shown in FIG. 3 includes an abutment means 40, a ramp section 42, a vertical fiber stop 44, a terminal end 46 of the first optical fiber 34 located at a focal point 48 of the optical lens 12, an abutment gap 50 located between a rearward portion 52 of the optical lens 12 and the terminal end 46 and an index of refraction matching adhesive 54 located within the abutment gap 50. An end view of the fiber alignment and retention device 10 shown in FIG. 4 includes the heat sensitive shrink sleeve 30 which has an inner lining 56 comprised of the index of refraction matching adhesive 54.

In the instant invention, the first optical fiber 34 transmits the optical signal 36 to the optical lens 12 which is employed to expand the optical signal 36. The expansion of the optical signal 36 is required to permit the passage of light from the first optical fiber 34 to the receiving optical lens and second optical fiber 38. The forwardly directed curved lens surface 32 is employed to direct the optical signal 36 to the receiving optical lens and second optical fiber 38. The lens 12 and the rearward extension 16 of the holding means 14 are molded together from a single piece of plastic material, acrylic being an example of one of the several materials available. The vee-shaped groove 18 is symmetrically located in the top surface 20 of the rearward extension 16 along the optical axis of the lens 12. The vee-shaped groove 18 is dimensioned to position the center axis of the first optical fiber 34 in coaxial alignment with the optical axis of the optical lens 12. Thus, for the particular size of the first optical fiber 34 employed, the vee-shaped groove 18 must be fashioned to the proper dimension. The rearward portion 52 of the lens 12 includes the ramp section 42 which causes the focal point 48 to be "in space" behind the lens 12 (shown in FIG. 3). The refraction and attenuation of the optical signal 36 is minimized by aligning the first optical fiber 34 with the same vertical plane passing through the focal point 48 as passes through the vertical stop 44. The abutment means 40 is designed to position the terminal end 46 of the first optical fiber 34 at the focal point 48. Formed from the single piece of plastic material, the abutment means 40 includes the ramp section 42 at an angle with the vertical fiber stop 44. An example of one of the several acceptable angles is an angle of approximately forty-five degrees. The fiber stop 44 is located at the bottom of the ramp section 42 at the connection of the rearward extension 16 and within the vertical plane passing through focal point 48 (see FIG. 3). The travel of the first optical fiber 34 is limited by the fiber stop 44 to properly align the terminal end 46. Note that the ramp section 42 may be replaced by a radiused curved section 58 (shown dotted in FIG. 3) comprised of the plastic material and located between the rearward portion 52 of the lens 12 and the fiber stop 44. The fiber stop 44 is then located between the radius curved section 58 and the rearward extension 16 of the holding means 14. The abutment gap 50 is an air space created by the separation of the fiber stop 44 and the rearward portion 52 of lens 12 located above the ramp section 42. The gap 50 separates the first optical fiber 34 comprised of glass from the lens 12 comprised of plastic. If air occupies the gap 50, the attenuation of the optical signal 36 will be significant. To avoid high attenuation of the optical signal 36, the gap 50 is filled with the index matching adhesive 54 which has a refraction index similar to both the glass and the plastic material. The index matching adhesive 54 reduces refraction and attenuation during transmission of the optical signal 36 from the first optical fiber 34 to the lens 12. A retention means is in mechanical communication with the rearward extension 16 for securely retaining the first optical fiber 34 within the vee-shaped groove 18. In the preferred embodiment, the retention means comprises the heat sensitive shrink sleeve 30 which collapses about the rearward extension 16 upon being heat activated at a temperature of approximately 85 degrees centigrade. The plastic material of the lens 12 and of the holding means 14 is not damaged at this temperature. The inner lining 56 of the shrink sleeve 30 includes the index matching adhesive 54 which automatically bonds the first optical fiber 34 in position within the vee-shaped groove 18 upon application of the heat. Using this method, air is not trapped between the terminal end 46 of the first optical fiber 34 and the focal point 48. It can be seen in FIG. 1 that the rearward extension is tapered in width so it has a progressively smaller width at locations previously closer to the lens. The tapered shape of rearward extension 16 around the vee-shaped groove 18 permits the shrink sleeve 30 to force the first optical fiber 34 and the index matching adhesive 54 towards the lens 12 as the shrink sleeve 30 contracts. The terminal end 46 is forced toward the fiber stop 44 and the index matching adhesive 54 of the inner lining 56 is forced by the applied heat to flow into and fill the abutment gap 50. The index matching adhesive 54 solidifies at ambient temperature and provides attenuation reduction of the optical signal 36. Note that the longitudinally extending vee-shaped groove 18 may be replaced by a longitudinally extending curved groove 60 (see FIG. 4) symmetrically located in the top surface 20 of the rearward extension 16 along the optical axis of the lens 12.

In practice, the first optical fiber 34 is guided into the vee-shaped groove 18 until the terminal end 46 of the first optical fiber 34 abuts the fiber stop 44. The shrink sleeve 30 is then placed about the rearward extension 16 and heat is applied to collapse the shrink sleeve 30 securing the first optical fiber 34 in the vee-shaped groove 18 and forcing the index matching adhesive 54 into the abutment gap 50. The terminal end 46 is then located at the focal point 48 of the lens 12 which ensures the reduction of refraction and attenuation of the optical signal 36.

In each of the FIGS. 5, 6 and 7 there is illustrated a cross-sectional view of an optical contact referred to by the general reference character 70 and incorporating the present invention. Each of the FIGS. 5, 6 and 7 incorporate the fiber alignment and retention device 10 while illustrating alternative retention means to the preferred embodiment. The optical contact 70 includes a plastic sheath 72, a buffer 74, an internal eyelet 76, an external eyelet 78 and an inspection hole 80. Additionally, the optical contact 70 shown in FIGS. 5, 6 and 7 include each of the elements of the fiber alignment and retention device 10 illustrated in FIGS. 1–4 except the heat sensitive shrink sleeve 30. However, the heat sensitive shrink sleeve 30 is compatible and preferred in FIGS. 5, 6 and 7. The first optical fiber 34 is protected by both the plastic sheath 72 and the buffer 74. The plastic sheath 72 is an outer layer or coating for providing protection of the first optical fiber 34 upon entry to the internal eyelet 76. The buffer 74 is an inner layer or coating for providing protection of the first optical fiber 34 between the interior of the plastic sheath 72 and a retention means. The buffer 74 is applied to the first optical fiber 34 via an extrusion process. The interior eyelet 76 which is comprised of metal is fitted and securely wrapped about the plastic sheath 72 and the buffer 74 for protecting the first optical fiber 34. The exterior eyelet 78 is also comprised of metal and is fitted and wrapped about a tapered end of the interior eyelet 76 and further is wrapped about the fiber alignment and retention device 10. The exterior eyelet 78 also includes the inspection hole 80 located in the top surface thereof. The inspection hole 80 permits visual verification that the terminal end 46 abuts the vertical fiber stop 44. In the designs of the optical contact 70 which employ a retaining means other than the heat sensitive shrink sleeve 30, droplets of the index matching adhesive 54 are inserted in the abutment gap 50 through the inspection hole 80. The exterior eyelet 78 also functions to lock the retaining means in place in designs which do not employ the shrink sleeve 30.

In FIG. 5, a mechanical clamp 85 is employed as the retention means. The mechanical clamp 86 utilized a clamp finger 88 to secure the first optical fiber 34 within the vee-shaped groove 18 and against the fiber stop 44. Note that the mechanical clamp 86 is fashioned from metal and is shaped to fit within the external eyelet 78 and abutted adjacent the tapered end of the internal eyelet 76. A passageway 90 is formed within the mechanical clamp 86 to encircle and secure the buffer 74 and to stabilize the first optical fiber 34 between the buffer 74 and the vee-shaped groove 18. The mechanical clamp 86 is held within the external eyelet 78 by a press-fit with the fiber alignment and retention device 10 being pressed into position therebehind.

In FIG. 6, a soft clamp 92 is employed as the retention means. The soft clamp 92 utilizes a soft finger 94 to secure the first optical fiber 34 within the vee-shaped groove 18 and against the fiber stop 44. The soft clamp 92 is fashioned from a resilient material such as silicon foam and is shaped to fit within the external eyelet 78 and abutted adjacent the tapered end of the internal eyelet 76. A rear portion of the soft clamp 92 is circular and includes an opening 96 through which the first optical fiber 34 passes through. The optical fiber 34 is inserted within the soft finger 94 which forces the optical fiber 34 into the vee-shaped groove 18. The soft clamp 92 is held within the external eyelet 78 by a press-fit with the fiber alignment and retention device 10 pressed in therebehind.

In FIG. 7, a spring finger 98 is employed as the retention means. The spring finger 98 is fashioned from metal and is an extension of the internal eyelet 76 and is bounded by the external eyelet 78. The fiber alignment and retention device 10 is forced into the external eyelet 78 and is secured by a press-fit. The spring finger 98 forces the first optical fiber 34 into the vee-shaped groove 18 and aligns the terminal end 46 with the focal point 48.

In FIG. 8, there is illustrated a first alternative embodiment of a fiber alignment and retention device referred to by the general reference character 100 and incorporating the present invention. Those elements of embodiment 100 common to the fiber alignment and retention device 10 of the preferred embodiment are designated with a single prime designation. The fiber alignment and retention device 100 includes an optical lens 12' comprised of plastic, a holding means 14', a rearward extension 16', a longitudinally extending vee-shaped groove 18' symmetrically located in a top surface 20', a heat sensitive shrink sleeve 30', a forwardly directed curved lens surface 32', a first light transmitting optical fiber 34' for transmitting an optical signal 36', a second optical conducting element 38' such as a receiving optical lens and a second light transmitting optical fiber for receiving the optical signal 36', an abutment means 40', a ramp section 42', a vertical fiber stop 44', a terminal end 46' of the first optical fiber 34' located at a focal point 48' of the optical lens 12', an abutment gap 50' located between a rearward portion 52' of the optical lens 12' and the terminal end 46' and an index of refraction matching adhesive 54'. The abutment means 40', ramp section 42', vertical fiber stop 44', terminal end 46', focal point 48', abutment gap 50' and index matching adhesive 54' are not visible in FIG. 8 but are duplicate to those of the preferred embodiment. The fiber alignment and retention device 100 further includes a first half cylinder 102 and a second half cylinder 104 of the rearward extension 16', a first longitudinal cutaway 106 and a second longitudinal cutaway 108 of the second half cylinder 104, and a shallow step 110 formed in an exterior surface 112 of the first half cylinder 102 and the second half cylinder 104.

The plastic optical lens 12' employs the forwardly directed curved lens surface 32' for reducing refraction and attenuation of the optical signal 36' when the optical signal 36' is transmitted from the first optical fiber 34' to the receiving optical lens and second optical fiber 38'. The holding means 14' which is molded to the optical lens 12' includes the rearward extension 16' which is cylindrically shaped. The cylindrical shaped rearward extension 16' includes the first half cylinder 102 and the second half cylinder 104. The vee-shaped groove 18' is symmetrically located in the top surface 20' of the first half cylinder 102 where the top surface 20' is positioned between the first half cylinder 102 and the second half cylinder 104. The vee-shaped groove 18' supports the first optical fiber 34' and the rearward extension 16' is molded to the optical lens 12' from a single piece of the plastic material. The second half cylinder 104 includes the first longitudinal cutaway 106 and the second longitudinal cutaway 108 which are each located between the second half cylinder 104 and the top surface 20' of the first half cylinder 102. Together, the first longitudinal cutaway 106 and the second longitudinal cutaway 108 of the second half cylinder 104 provide a spring tension on the first optical fiber 34'. The abutment means 40' is formed at the interface between the optical lens 12' and the top surface 20' for positioning the terminal end 46' of the first optical fiber 34' at the focal point 48' of the optical lens 12'. The abutment means 40' is formed from the single piece of plastic material and includes the ramp section 42' and the vertical stop 44'. The vertical stop 44' which positions the terminal end 46' is located where the ramp section 42' is connected to the top surface 20' of the first half cylinder 102. The abutment gap 50' is disposed between the rearward portion 52' of the optical lens 12' and the terminal end 46' and above the ramp section 42'. The index matching adhesive 54' is disposed within the abutment gap 50'. The retention means comprises the heat sensitive shrink sleeve 30' placed about the holding means 14' in the shallow step 110 formed in the exterior surface 112 of the first half cylinder 102 and the second half cylinder 104 for securely retaining the first optical fiber 34' within vee-shaped groove 18'. The shrink sleeve 30' in the first alternative embodiment does not include the inner lining 56 of the preferred embodiment because the shrink sleeve 30' of the first alternative embodiment does not contact the first optical fiber 34'.

Figure 9:
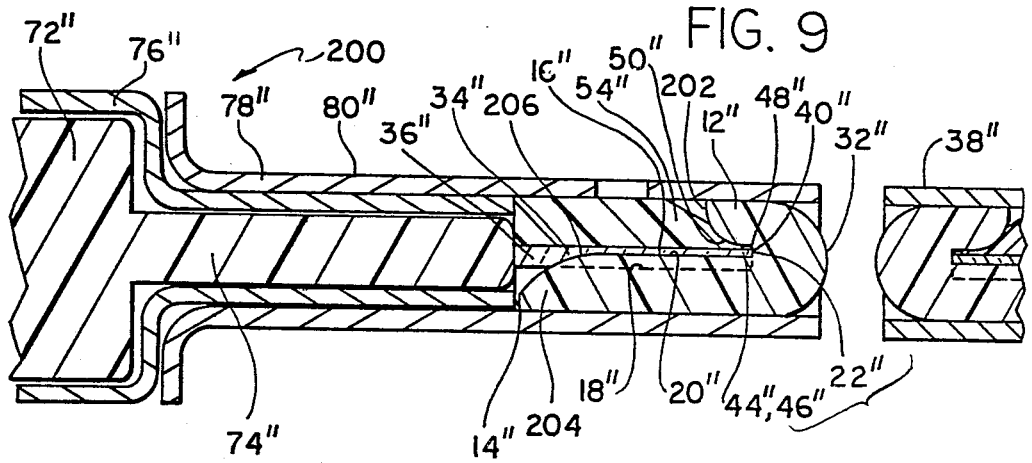
FIG. 9 is a cross-sectional view of a second alternative embodiment of a fiber alignment and retention device of the present invention.

In FIG. 9, there is illustrated an optical contact referred to by the general reference character 200 and incorporating a second alternative embodiment of a fiber alignment and retention device of the present invention. Those elements of embodiment 200 common to the fiber alignment and retention device 10 of the preferred embodiment are designated with a dobule prime designation. The optical contact 200 includes an optical lens 12" comprised of plastic material, a holding means 14", a rearward extension 16", a longitudinally extending vee-shaped groove 18", a top surface 20", an interface 22", a forwardly directed curved lens surface 32", a first light transmitting optical fiber or source 34", an optical signal 36", a second optical conducting element 38" such as a receiving optical lens and a second light transmitting optical fiber for receiving the optical signal 36", an abutment means 40", a vertical fiber stop 44", a terminal end 46", a focal point 48", an abutment gap 50" and an index of refraction matching adhesive 54". Also shown is a plastic sheath 72", a buffer 74", an internal eyelet 76", an external eyelet 78" and a side inspection hole 80" of the optical contact 200. The fiber alignment and retention device of the optical contact 200 further includes a rearwardly directed radiused surface 202 and a curved foot 204 located at a rearward end 206 of the rearward extension 16".

The optical lens 12" in addition to having the forwardly directed curved lens 32" for reducing refraction and attenuation of the optical signal 36" also has the rearwardly directed radiused surface 202 which provides guidance to and retention of the first optical fiber 34". The holding means 14" is molded to the optical lens 12" and the first optical fiber 34" is inserted into the vee-shaped groove 18" located in the top surface 20" of the rearward extension 16". The rearward extension 16" also includes the rearward end 206 which is formed into the curved foot 204 which facilitates the entering and guiding of the first optical fiber 34" into the vee-shaped groove 18". The abutment means 40" is formed at the interface 22" of the optical lens 12" and the rearward extension 16" for positioning the terminal end 46" of the first optical fiber 34" at the focal point 48". The abutment means 40" is comprised of the single piece of plastic material in which is formed the vertical fiber stop 44" where the rearwardly directed radiused surface 202 is connected to the rearward extension 16". The abutment gap 50" is disposed between the rearwardly directed radiused surface 202 and the first optical fiber 34" and contains the index matching adhesive 54". The abutment means 40", vertical fiber stop 44", terminal end 46", focal point 48", abutment gap 50" and index matching adhesive 54" are not visible in FIG. 9 but are duplicate to those of the preferred embodiment. The rearwardly directed radiused surface 202 is also employed as the retention means utilizing a press fit to secure the first optical fiber 34". Note that the first optical fiber 34" is guided into the vee-shaped groove 18" via the curved foot 204 and beneath the rearwardly directed radiused surface 202 which applies the press fit. The second alternative embodiment incorporated in the optical contact 200 does not utilize a shrink sleeve or a clamp and further the radiused surface 202 could also be any appropriate surface such as an angled surface. The inspection hole 80" through which the index matching adhesive 54" is inserted is located in the side of the optical contact 200 which permits visual verification that the terminal end 46" is abutting the vertical fiber stop 44" and the focal point 48" of optical lens 12".

Figure 9A:
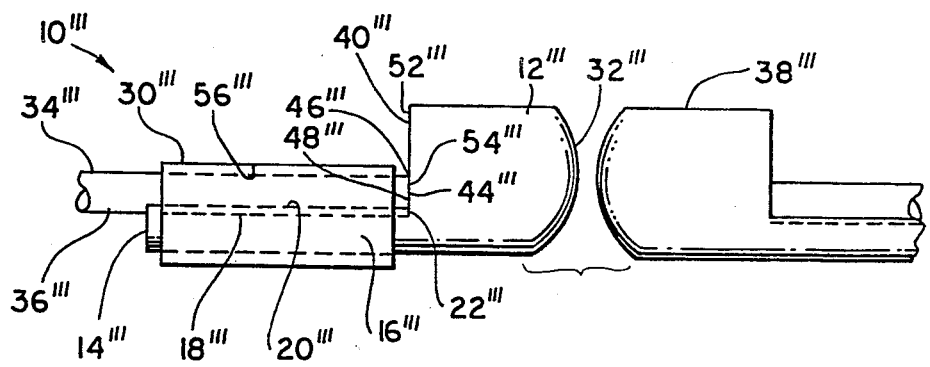
FIG. 9A is a side elevational view of a third alternative embodiment of a fiber alignment and retention device of the present invention.

In FIG. 9A, there is illustrated a third alternative embodiment of a fiber alignment and retention device referred to by the general reference character 300 and incorporating the present invention. Those elements of embodiment 300 common to the fiber alignment and retention device 10 of the preferred embodiment are designated with a triple prime designation. The fiber alignment and retention device 300 is to be contrasted with the fiber alignment and retention device 10 of FIG. 3. The fiber alignment and retention device 300 includes each of the elements disclosed in FIG. 3 except the ramp section 42, the abutment gap 50 and the radiused curved section 58. The elements included by the fiber alignment and retention device 300 are a lens 12''', a holding means 14''', a rearward extension 16''', a longitudinally extending vee-shaped groove 18''' symmetrically located in a top surface 20''' of the rearward extension 16''' and an interface 22''' located between the optical lens 12''' and the rearward extension 16'''. Also included is a heat sensitive shrink sleeve 30''', a forwardly directed curved lens surface 32''', a first light transmitting optical fiber or source 34''' for transmitting an optical signal 36''' and a second optical conducting element 38''' such as a receiving optical lens and a second light transmitting optical fiber for receiving the optical signal 36'''. Further, FIG. 9A illustrates an abutment means 40''', a vertical fiber stop 44''', a terminal end 46''' of the first optical fiber 34''' located at a focal point 48''' of the lens 12''', a rearward portion 52''', an index of refraction matching adhesive 54''' located between the terminal end 46''' and the vertical fiber stop 44'''. The shrink sleeve 30''' further includes an inner lining 56''' comprised of the index of refraction matching adhesive 54'''.

The refraction and attenuation of the optical signal 36''' is minimized by aligning the first optical fiber 34''' with the same vertical plane passing through the focal point 48''' as passes through the vertical stop 44. The abutment means 40''' is designed to position the terminal end 46''' of the first optical fiber 34''' at the focal point 48'''. Formed from the single piece of plastic material, the abutment means 40''' includes the vertical fiber stop 44''' located at the bottom of the rearward portion 52''' of lens 12''' at the connection of the rearward extension 16''' and within the imaginary plane passing through the focal point 48'''. The travel of the first optical fiber 34''' is limited by the fiber stop 44''' to properly align the terminal end 46''' and the fiber stop 44'''. The means for retaining the first optical fiber 34''' within the vee-shaped groove 18''' is the shrink sleeve 30''' which collapses about the rearward extension 16''' upon being heat activated. The remainder of the operation of the fiber alignment and retention device 300 is duplicate to the operation of the fiber alignment and retention device 10 of the preferred embodiment.

Although the present invention has been described in terms of the presently preferred embodiment(s), it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A fiber alignment and retention device comprising, in combination:
    an optical lens comprised of a plastic material having a forwardly directed curved lens surface for reducing refraction and attenuation of an optical signal when said optical signal is transmitted from a first light transmitting optical fiber to a second light transmitting optical fiber;
    a holding means connected to the optical lens having a rearward extension with a longitudinally extending groove symmetrically located in a top surface of said rearward extension for supporting said first light transmitting optical fiber and wherein the optical lens and said rearward extension are molded together from a single piece of plastic material;
    an abutment means formed at an interface between the optical lens and said rearward extension for positioning a terminal end of said first light transmitting optical fiber at a focal point of the optical lens, said abutment means being formed from said single piece of plastic material and comprised of a ramp section having a vertical stop, said vertical stop being located where said ramp section is connected to said rearward extension for positioning said terminal end, said abutment means further including an abutment gap disposed between a rearward portion of the optical lens and said terminal end of said first light transmitting optical fiber and above said ramp section, said abutment gap containing an index matching adhesive for reducing refraction and attenuation of said optical signal between said first light transmitting optical fiber and the optical lens; and
    a retention means in mechanical communication with said rearward extension of the holding means for securely retaining said first light transmitting optical fiber within said longitudinally extending groove.

2. The fiber alignment and retention device as recited in claim 1 wherein the retention means comprises a heat sensitive shrink sleeve having an inner lining comprised of an index matching adhesive for reducing refraction and attenuation of said optical signal between said first light transmitting optical fiber and the optical lens.

3. A fiber alignment and retention device comprising, in combination:
    an optical lens comprised of a plastic material having a forwardly directed curved lens surface for reducing refraction and attenuation of an optical signal when said optical signal is transmitted from a first light transmitting optical fiber to a second light transmitting optical fiber;
    a holding means molded to the optical lens having a cylindrical shaped rearward extension, said cylindrical shaped rearward extension, said cylindrical shaped rearward extension being comprised of a first half cylinder and a second half cylinder wherein said first half cylinder includes a longitudinally extending groove symmetrically located in a top surface of said first half cylinder with said top surface of said first half cylinder being positioned between said first half cylinder and said second half cylinder, said groove for supporting said first light transmitting optical fiber and wherein the optical lens and said cylindrical shaped rearward extension are molded together from a single piece of plastic material, said second half cylinder further including a first longitudinal cutaway and a second longitudinal cutaway, each of said first and said second longitudinal cutaways being located between said second half cylinder and said top surface of said first half cylinder for providing spring tension on said first light transmitting optical fiber by said second half cylinder;
    an abutment means formed at an interface between the optical lens and said top surface of said first half cylinder for positioning a terminal end of said first light transmitting optical fiber at a predetermined distance behind the optical lens, said abutment means being formed from said single piece of plastic material and comprised of a vertical stop, said abutmemt means further including an abutment gap disposed between a rearward portion of the optical lens and said terminal end of said first light transmitting optical fiber said abutment gap containing an index matching adhesive for reducing refraction and attenuation of said optical signal between said first light transmitting optical fiber and the optical lens; and a retention means in mechanical communication with said cylindrical shaped rearward extension of the holding means for securely retaining said first light transmitting optical fiber within said longitudinally extending groove, the retention means comprising a heat sensitive shrink sleeve placed about said first half cylinder and said second half cylinder.

4. A fiber alignment and retention device comprising, in combination:

an optical lens having a forwardly directed curved lens surface for reducing refraction and attenuation of an optical signal when said optical signal is transmitted from an optical fiber of a first optical transmission means to a second optical transmission means;

a holding means connected to the optical lens having a rearward extension with a longitudinally extending groove for supporting said optical fiber of said first optical transmission means;

an abutment means formed at an interface between the optical lens and said rearward extension of the holding means for positioning a terminal end of said optical fiber at a focal point of the optical lens; and a retention means for pressing against a portion of an optical fiber which lies in said groove and for pressing against a location on said rearward extension which lies substantially opposite said groove, to securely retain said optical fiber within said longitudinally extending groove;

said optical lens and said rearward extension of the holding means are molded together from a single piece of plastic material.

5. A fiber alignment and retention device comprising, in combination:

an optical lens having a forwardly directed curved lens surface for reducing refraction and attenuation of an optical signal when said optical signal is transmitted from an optical fiber of a first optical transmission means to a second optical transmission means;

a holding means connected to the optical lens having a rearward extension with a longitudinally extending groove for supporting said optical fiber;

an abutment means formed at an interface between the optical lens and said rearward extension of the holding means for positioning a terminal end of the optical fiber at a focal point of the optical lens; and a retention means associated with said holding means for securely retaining said optical fiber within said longitudinally extending groove;

said retention means comprising a heat sensitive shrink sleeve for lying about said rearward extension and an optical fiber therein, said sleeve including an inner lining comprised of an index matching adhesive for reducing refraction and attenuation of said optical signal between said first optical transmission means and the optical lens.

6. A fiber alignment and retention device comprising, in combination:

an optical lens having a forwardly directed curved lens surface for reducing refraction and attenuation of an optical signal when said optical signal is transmitted from an optical fiber of a first optical transmission means to a second optical transmission means;

a holding means connected to the optical lens having a rearward extension extending rearwardly from the lens, with a longitudinally extending groove for supporting said optical fiber;

an abutment means formed at an interface between the optical lens and said rearward extension of the holding means for positioning a terminal end of the optical fiber at a focal point of the optical lens; and a retention means associated with said holding means for securely retaining said optical fiber within said longitudinally extending groove;

said retention means comprising a heat sensitive shrink sleeve for lying about said rearward extension and about an optical fiber in said groove;

said rearward extension being tapered to have a smaller width at positions progressively closer to said lens.

* * * * *